United States Patent [19]

Matino et al.

[11] Patent Number: 4,946,259

[45] Date of Patent: Aug. 7, 1990

[54] COLOR LIQUID CRYSTAL DISPLAY AND METHOD OF MANUFACTURE

[75] Inventors: Haruhiro Matino, Takaido Higashi; Toshihiro Ueki, Machida; Yasuhisa Oana; Motoji Kajimura, both of Yokohama, Japan

[73] Assignee: International Business Machines Corporation, Armonk, N.Y.

[21] Appl. No.: 471,016

[22] Filed: Jan. 24, 1990

Related U.S. Application Data

[63] Continuation of Ser. No. 225,434, Jul. 28, 1988, abandoned.

[30] Foreign Application Priority Data

Aug. 18, 1987 [JP] Japan ................................ 62-204967

[51] Int. Cl.$^5$ ............................................ G02F 1/133
[52] U.S. Cl. ............................. 350/339 F; 350/339 R
[58] Field of Search ................ 350/339 F, 339 R, 314, 350/316, 317, 347 E, 337

[56] References Cited

U.S. PATENT DOCUMENTS

| | | | |
|---|---|---|---|
| 2,567,713 | 9/1951 | Kaplan | 350/316 |
| 4,097,128 | 6/1978 | Matsumoto et al. | 350/347 E |
| 4,592,623 | 6/1986 | Yamamoto et al. | 350/337 |
| 4,601,546 | 6/1986 | Ohta | 350/339 R |
| 4,712,874 | 12/1987 | Sekimura et al. | 350/339 F |
| 4,744,639 | 5/1988 | Tsuboyama | 350/339 R |
| 4,793,691 | 12/1988 | Enomoto et al. | 350/339 R |

FOREIGN PATENT DOCUMENTS

| | | | |
|---|---|---|---|
| 56-140324 | 3/1983 | Japan . | |
| 60-61724 | 4/1985 | Japan | 350/339 F |
| 60-263122 | 6/1987 | Japan . | |

*Primary Examiner*—Stanley D. Miller
*Assistant Examiner*—Anita Pellman Grass
*Attorney, Agent, or Firm*—Bernard E. Shay

[57] ABSTRACT

A color liquid crystal display comprises a liquid crystal interposed between two transparent electrodes. The electrode on at least one side of the liquid crystal comprises a plurality of pixel electrodes, each pixel electrode defining the area of one pixel of the display. Two or more pixels together form a picture element of the color display. One pixel (a chromatic pixel) of each picture element has a color filter covering the pixel. The other pixel (an achromatic pixel) of each picture element has a translucent (noncolored) filter covering the pixel. The translucent filter also covers a peripheral region of each color pixel. The peripheral region of each chromatic pixel (which is covered by both the color filter and the translucent filter) forms a light shield to increase the contrast of the display. A transparent (noncolored) filter is provided over each achromatic pixel to adjust the overall thickness of the liquid crystal, so as to minimize light leakage at the achromatic pixels. By minimizing light leakage, high contrast is obtained.

13 Claims, 5 Drawing Sheets

COLOR LIQUID CRYSTAL DISPLAY AND METHOD OF MANUFACTURE

This is a continuation of application Ser. No. 225,434 filed Jul. 28, 1988 and now abandoned.

BACKGROUND OF THE INVENTION

This invention relates to a color liquid crystal display which has color filters and which can display colors, and relates to a method for manufacturing the color liquid crystal display.

Generally, a liquid crystal display has a structure in which transparent electrodes are formed on opposite surfaces of opposed glass substrates so as to constitute a number of pixels and in which a liquid crystal composition is interposed between these electrodes.

When it is intended to provide a color display using such a liquid crystal display, it is well-known to form color filters of red (R), green (G) and blue (B) at locations of corresponding pixels respectively on the glass substrate so that one display element consists of three pixels of R, G, and B.

Published Unexamined Japanese Patent Application (PUPA) 60-263122 (263122/85) discloses a color display panel which has achromatic pixels (colorless pixels) such as black or gray in addition to chromatic pixels (color pixels) or red, green and blue.

Published Unexamined Japanese Patent Application (PUPA) 56-140324 (140324/81) discloses a method used to form a light shielding layer by laminating red, green and blue color filters on their peripheral areas.

Because the light shielding layer formed by laminating the color filters as shown in the above-mentioned PUPA 56-140324 surrounds each color filter, the thickness of the liquid crystal layer cannot be made thinner than the light shielding layer. In addition, in order to arrange the liquid crystal in such a manner that its thickness can be freely set, it is necessary to laminate a substantially thick transparent material over the color filters.

In addition, the above-mentioned PUPA 60-263122 only discloses achromatic pixels, and does not refer to the filters and the light shielding layer.

SUMMARY OF THE INVENTION

It is one object of this invention to provide a color liquid crystal display which not only has a wide reproduction range of colors, but also has high contrast, and which has a thin light shielding layer.

It is another object of this invention to provide a method for manufacturing such a color liquid crystal display.

A color liquid crystal display of this invention comprises color filters formed at locations corresponding to chromatic pixels. Each chromatic pixel has a light transmitting area for a predetermined wavelength. The display also comprises translucent filters formed at locations corresponding to achromatic pixels and near an outer periphery of locations corresponding to the chromatic pixels so as to be overlapped with the color filters.

A manufacturing method of this invention comprises the steps of: forming material constituting translucent filters on a substrate; removing the material constituting the translucent filters at locations corresponding to pixels on which color filters are to be formed from the substrate; and forming the material constituting the color filters at color filter locations corresponding to pixels on which the color filters are to be formed on the substrate and at locations which are near the color filter locations so as to be overlapped with the material constituting the translucent filters.

In accordance with this invention, colors can be produced by combining light which has passed through the color filters with light which has passed through the translucent filters. Therefore, many colors can be displayed.

Further, the light shielding layer is formed by overlapping the translucent filters with the color filters. So, high contrast is obtained and the light shielding layer can be thin.

DESCRIPTION OF THE PREFERRED EMBODIMENTS

Figure 1:
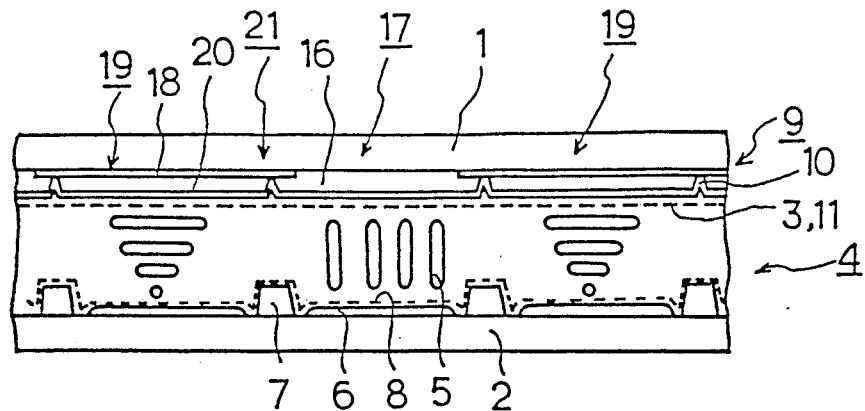
FIG. 1 is a front cross sectional view of one embodiment of a color liquid crystal display according to this invention.

FIG. 1 shows a front cross sectional view of one embodiment of a color liquid crystal display according to this invention.

The color liquid crystal display shown in FIG. 1 has a basic structure in which transparent electrodes 3 and 6 are formed on opposite surfaces of opposed glass substrates 1 and 2 to constitute a number of pixels. Twisted-Nematic (TN) liquid crystal 5 is interposed between these electrodes 3 and 6.

On the glass substrate 2, circuits for pixels each of which has a pixel electrode 6, which is a transparent electrode, and an amorphous thin film transistor (a-SiTFT, not shown) are vertically and horizontally positioned all over a screen to constitute a screen with a number of vertically and horizontally positioned pixels. Gates and sources of TFTs are connected by row and column to gate electrode wirings 7 and source electrode wirings (not shown) that extend vertically and horizontally, respectively. Then, orientation film 8 is formed to cover them.

Formed on the glass substrate 1 is a filter layer 9 over which a protective film 10 and a common electrode 11, which is the transparent electrode 3 consisting of ITO (indium-tin-oxide), are laminated.

Figure 2:
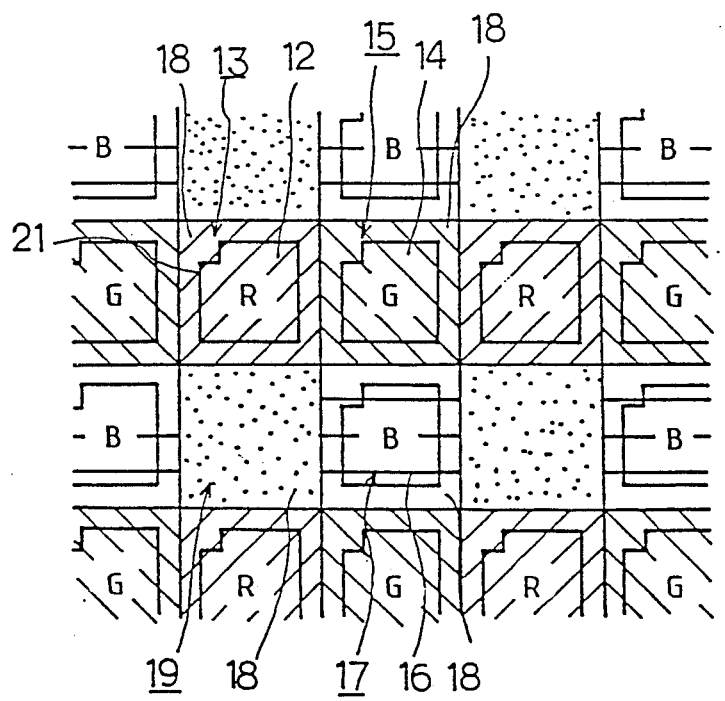
FIG. 2 is a partial plane view of FIG. 1.

FIG. 2 is a plane view of the glass substrate 1 illustrating the structure of the filter layer 9 in more detail.

In the color liquid crystal display, one display element is formed by positioning four pixels, that is, a red pixel 13 with a square red filter 12, a green pixel 15 with a square green filter 14, a blue pixel 17 with a square blue filter 16 and a pixel 19 with a translucent (gray) filter 18, at the upper left quadrant, the upper right quadrant, the lower right quadrant and the lower left quadrant of a square, respectively.

The structure of filter layer 9 of the red, green and blue pixels 13, 15 and 17 with the red, green and blue filters 12, 14 and 16, respectively (that is, the chromatic pixels) is such that only the filters 12, 14 and 16 are formed at locations which are slightly inside (2-5 microns) the locations corresponding to the pixel electrodes 6 formed on the glass substrate 2. The translucent filter 18 and each of the color filters 12, 14 and 16 are laminated at other locations, that is, outside the abovementioned locations which are slightly inside the locations corresponding to the pixel electrodes 6 formed on the glass substrate 2.

The filter layer 9 of the achromatic pixel 19 with the translucent filter 18 is formed by laminating the translucent filter 18 and a transparent material 20.

The red, green and blue filters 12, 14 and 16 consist of gelatin dyed in corresponding colors by, for example, gelatin dyeing method. The translucent filter 18 consists of Cr (chromium), and the transparent material 20 consists of noncolored gelatin.

Figure 3:
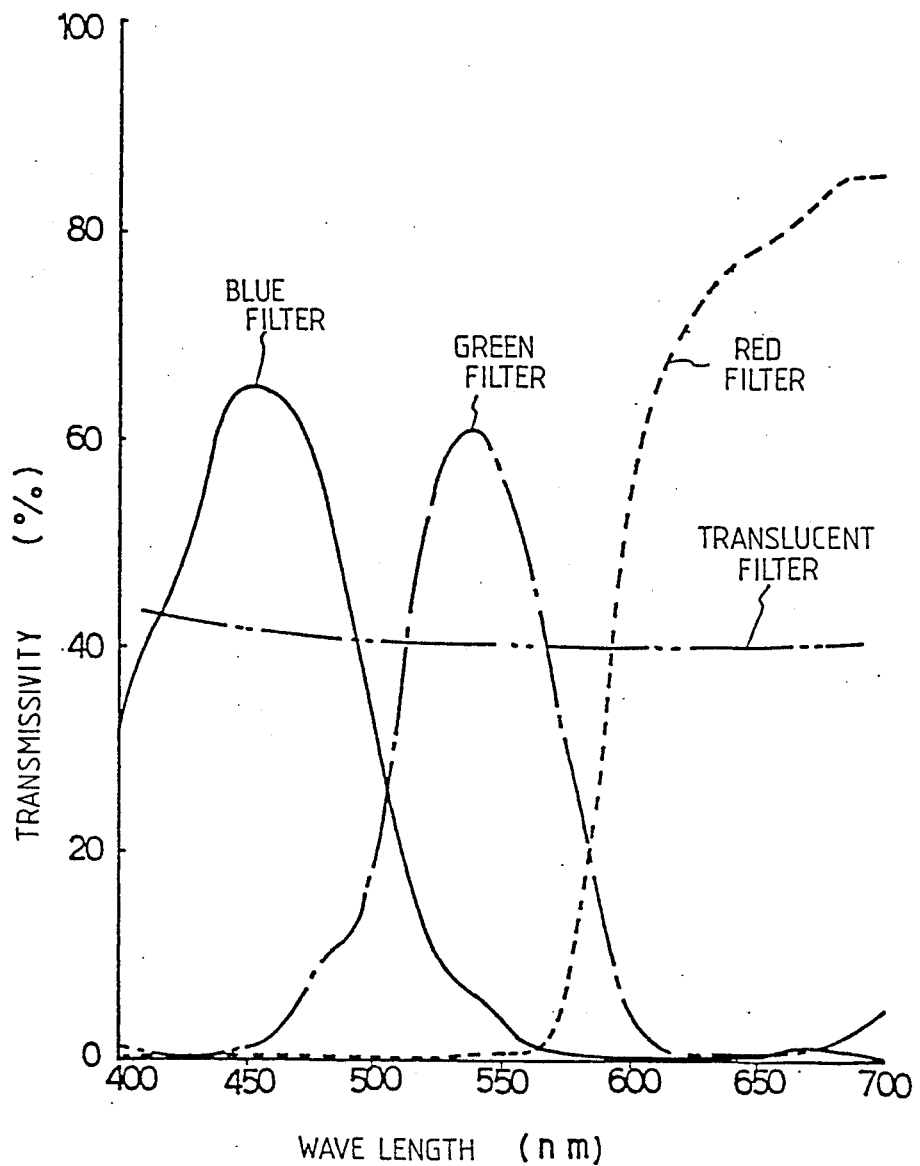
FIG. 3 is a diagram illustrating the spectral transmission characteristics of each filter.

Spectrum transmission rate characteristics of the filters are set as shown in FIG. 3. Here, the average transmissivity of the red, green and blue filters 12, 14 and 16 in a range of wavelength from 400 nm to 650 nm is 10%, 7% and 8%, respectively. The transmissivity of the translucent filter 18 in this range is 39.8% (optical density O.D. =0.4).

Multicoloring can be realized by setting the transmissivity of the translucent filter 18 at this value. That is, if the transmissivity of the translucent filter 18 is too low, the colors of the red, green or blue filters 12, 14 or 16, or their combination will not be made lighter by the translucent filter 18. For example, red will not be made pink by combining the red filter 12 and the translucent filter 18, but the color remains substantially red as it is.

On the other hand, if the transmissivity of the translucent filter 18 is too high, the colors of the red, green or blue filters 12, 14 or 16, or their combination will be substantially the color of the light source (not shown) by combination with the translucent filter 18. For example, red will not be made pink by combining the red filter 12 with the translucent filter 18, but the color becomes substantially the same as the color of the light source.

According to an evaluation test on visibility for images by the human eye, it has been confirmed that color can be added to the translucent filter 18 as described above by the colored filters 12, 14 and 16 if the optical density of the translucent filter 18 is in a range of 0.3 to 1.5.

Figure 4:
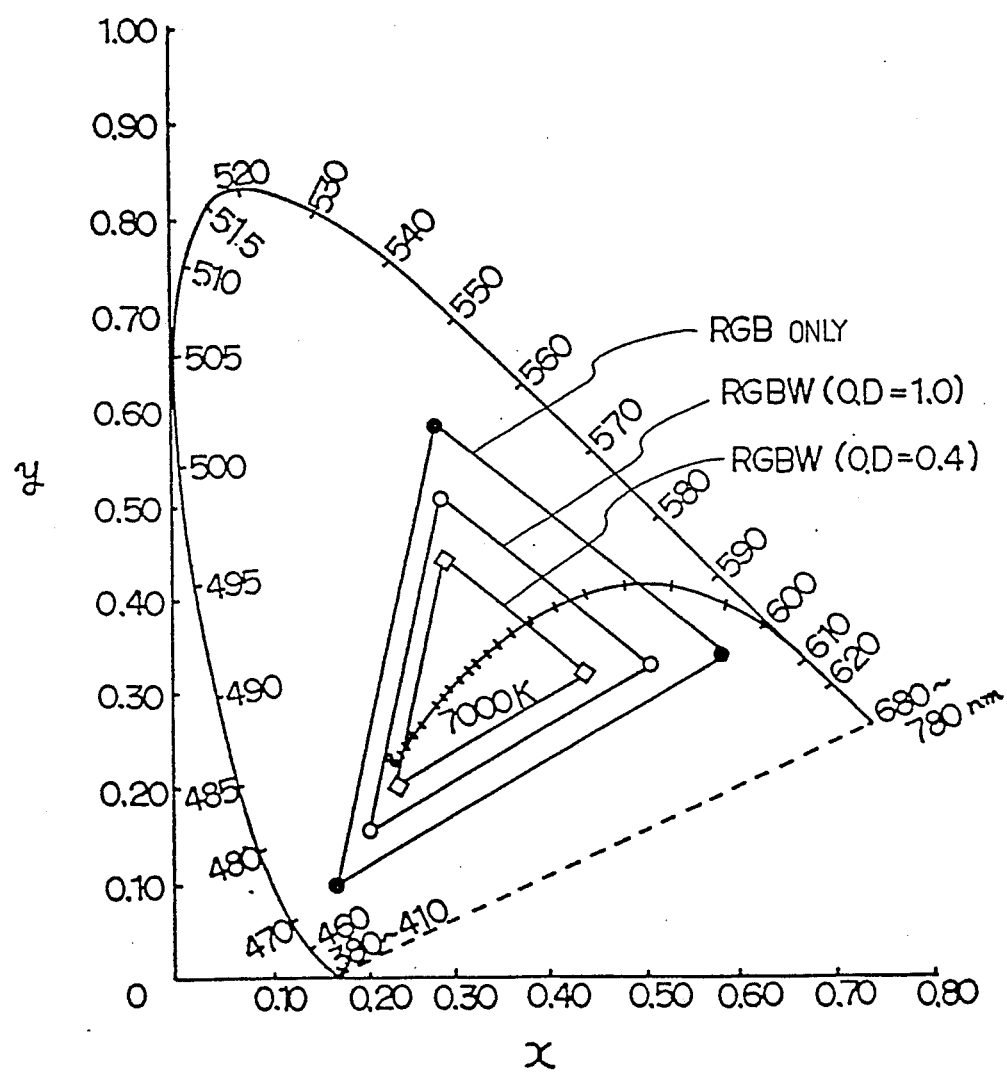
FIG. 4 is a chromaticity diagram for illustrating optimum values of the optical density of a translucent filter.

In addition, the following conclusion has been reached. FIG. 4 is a chromaticity diagram at an opening rate of 50% in a first case where only the filters 12, 14 and 16 are provided, in a second case where the translucent filter 18 whose optical density O.D. is 1.0 is provided as well as the filters 12, 14 and 16, and in a third case where the translucent filter 18 whose optical density O.D. is 0.4 is provided as well as the filters 12, 14 and 16. FIG. 4 shows a chromaticity triangle of only red, green and blue, and a chromaticity triangle when white light passed through the translucent filters 18 with different optical density O.D. is added.

Here, the opening rate indicates the ratio of the area of a pixel through which light passes to the total area of the pixel. As can be seen from the drawing, although, when white light is added to red, green and blue, each coordinate approximates the color temperature of the light source (7,000 degrees K in this embodiment), its rate can be controlled by the optical density O.D. of the translucent filter 18.

The condition where difference of colors can be recognized by difference of lightness, which is one of three elements of color, was sought from evaluation of a plurality of subjects. Then, in this embodiment, it has been found that addition of color at the optical density O.D. =0.4 is excellent in visibility. For example, in the case where a color is added to blue, if white light of O.D. =1.0 is added, blue cannot be distinguished from light blue, and there is a high possibility that they will be mistaken for each other. On the other hand, if O.D. =0.4 is added, then blue, light blue and white (70000 degrees K) can surely be identified, and there is no possibility of misidentification.

If, in this embodiment, the liquid crystal is used as an optical shutter, it is possible to display a total of 16 colors which consist of six colors on the RGB triangle [red, yellow, green, bluish green, blue and pink (purplish pink)], six colors on the RGBW triangle (the above colors with lighter hues), black, black+W (light black), white (red+green+blue), and white+W (intensified white). Thus, when the opening rate is 50%, the optical density O.D. of 0.4 is optimum. If the opening rate becomes larger than 50%, there is no trouble in practical use even if the optical density O.D. is made larger than 0.4.

The thickness of the filter layer 9 should be in a range of 0.5 to 2.0 microns. This is because, although the density of color depends generally on the thickness of the filter layer 9, if it is thinner than 0.5 micron, desired spectrum transmission characteristics for R, G and B cannot be obtained, while, if it is thicker than 2.0 microns, the filter layer 9 becomes dark according to the state in which light passes through the liquid crystal layer, and thus the contrast is lowered.

Variation of the thickness of the filter layer 9 should be as small as possible.

Figure 5A:
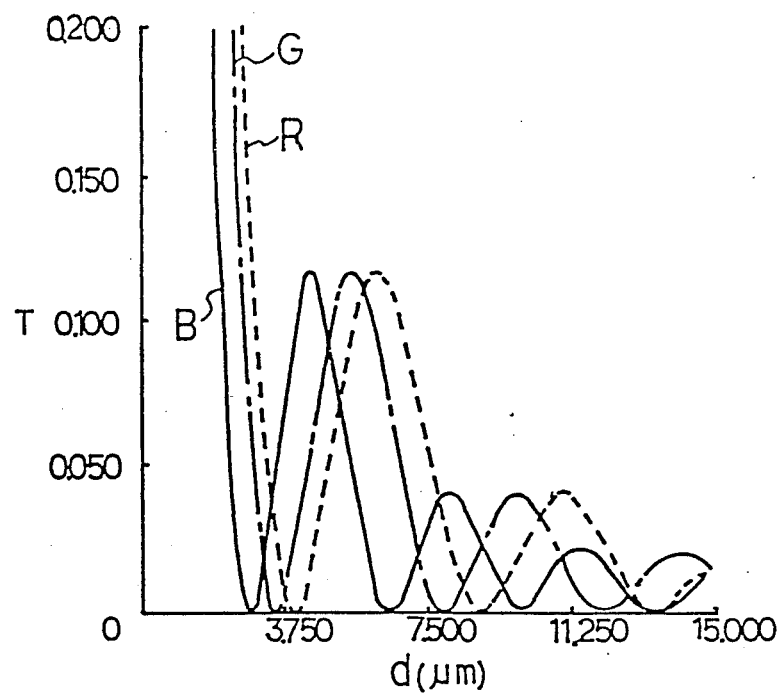
FIGS. 5(a) and 5(b) are diagrams illustrating the relationship between the thickness of a liquid crystal and the transmissivity of light passing through the liquid crystal.
Figure 5B:
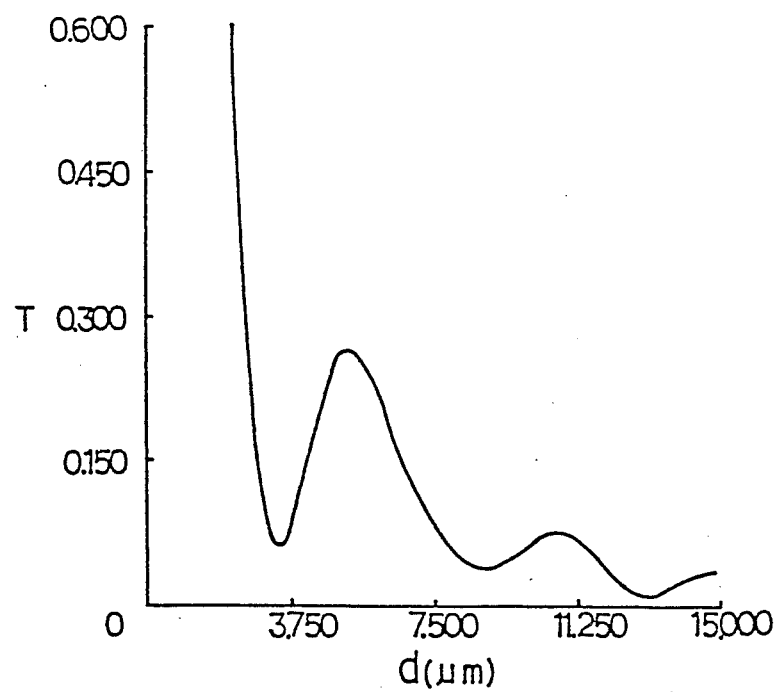

As shown in FIG. 5(a), the relationship between the thickness d of the liquid crystal layer and the transmissivity T of the liquid crystal layer in a state where planes of polarization of polarizing plates are parallel with each other and voltage is not applied on the liquid crystal layer (the off state) depends on the wavelength of the incident light, that is, the color of each filter. FIG. 5(b), shows the integration of the relationship between the thickness of the liquid crystal layer and the transmissivity of the liquid crystal in the above state.

The graph in FIG. 5(a) will be described in more detail. The anisotropy of the refractive index n of the liquid crystal through which light passes is 0.1325. The curve B represents the characteristics of blue light with a wavelength of 4,460 angstroms, curve G represents characteristics of green light with a wavelength of 5,460 angstroms, and curve R represents the characteristics of red light with a wavelength of 6,110 angstroms. Thickness d (microns) of the liquid crystal layer where the light transmissivity T becomes 0% is 2.92, 6.52 . . . for B, 3.57, 7.98 . . . for G, and 3.99, 8.93 . . . for R.

In this embodiment, the thickness of the liquid crystal layer is set to d=8.98 microns which is one of the points corresponding to the trough in the graph in FIG. 5(b). If the transparent material 20 is not used in this embodiment, the difference between the thickness of the liquid crystal layer at the locations of the color filters 12, 14 and 16 and the thickness of the liquid crystal layer at the locations of the translucent filters 18 becomes about 1.5 microns, so that, as can be clearly seen from FIGS. 5a and 5b, if the thickness is set so as not to allow transmission of light when no voltage is applied, light leaking from the translucent area will significantly reduce the contrast.

Therefore, in this embodiment, the transparent material 20 is laminated on the translucent filter 18 which is a relatively thin film, so that the variation of the thickness between the color filters 12, 14 and 16 and the translucent filter 18 will be 0.1 micron. Experiments have revealed that variations of the thickness up to 0.5 micron do not cause trouble in the practical use.

The thickness of the liquid crystal layer will be further discussed. The following is the reason why, in this embodiment, the thickness is not set at, for example, d=3.51 microns, which is also one of the points corresponding to a trough of the graph in FIG. 5(b). It is usually difficult to manufacture color filters 12, 14 and 16 of identical thicknesses; the thicknesses of the color filters normally vary. In FIG. 5(a), the light transmissivity of R, G and B near d=3.51 microns varies greater than that near d=8.98 microns. Therefore, because usually the thickness of the color filters 12, 14 and 16 varies, the difference of light transmissivity between the color filters 12, 14 and 16 becomes smaller when the thickness of the liquid crystal layer is set at 8.98 microns rather than at 3.51 microns, the variation of the contrast becomes smaller.

On the other hand, because the response speed of the liquid crystal becomes lower as the thickness of the liquid crystal layer is increased, in the case of this embodiment, the range of the thickness allowable for the liquid crystal is 11 microns or less; it may be best to set the thickness of the liquid crystal layer near d=8.98 microns. However, the thickness of the liquid crystal layer may be set at d=3.51 microns if the thickness of the film can be accurately controlled.

In addition, the red, green and blue pixels 13, 15 and 17 (the chromatic pixels other than the achromatic pixel 19 corresponding to translucent filter 18) have the light shielding layers 21. As described above, light shielding layers 21 are formed by laminating (overlapping) the translucent filter 18 and the color filters 12, 14 and 16 at the periphery of locations which are slightly inside of the locations corresponding to edges of the pixel electrodes 6 formed on the glass substrate 2 of the filter layers 9 for the pixels 13, 15 and 17 having the color filters 12, 14 and 16, respectively. The light shielding layer 21 constituted in such a manner has a transmissivity of 1% or less because of the color filters 12, 14 and 16, and the translucent filter 18 with the above-mentioned transmissivity. This eliminates light leakage from adjacent pixels or that between pixels, and provides a high contrast display.

Next, a method for manufacturing a glass substrate 1 of the color liquid crystal display will be described.

First, Cr is sputtered on the glass substrate 1 to form a Cr layer with a thickness of 300 angstroms (optical density O.D. =0.4).

Figure 6:
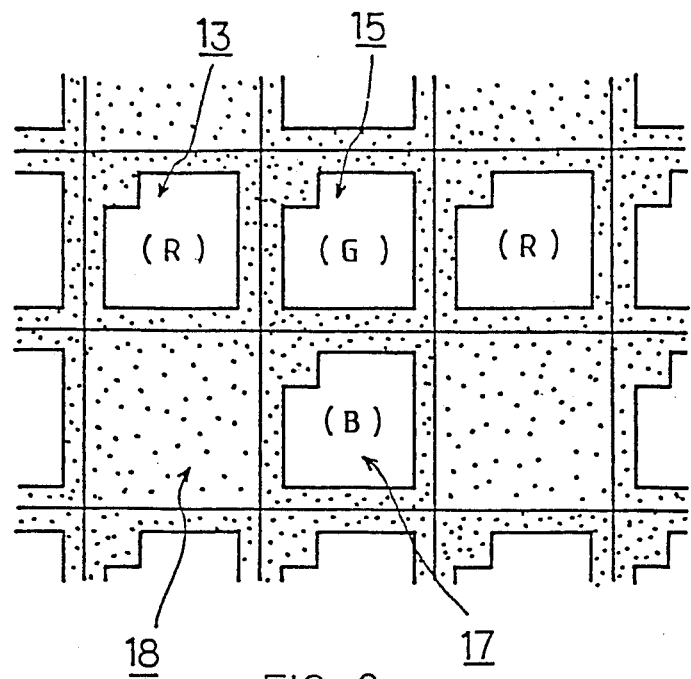
FIG. 6 is a partial plane view of a color liquid crystal display for illustrating a manufacturing method according to an embodiment of the invention.

Then, as shown in FIG. 6, for the pixels 13, 15 and 17 at which the red, green and blue filters 12, 14 and 16 should be formed, Cr is removed by photolithography from locations which are slightly (2-5 microns) inside the locations corresponding to the pixel electrodes 6 formed on the glass substrate 2. At this time, Cr is not removed from the pixels 19 at which the translucent filters 18 are to be formed.

In addition, for the pixels at which the red, green and blue filters 12, 14 and 16 should be formed, color filters of corresponding colors are formed on the glass substrate 1 and residual Cr as the red, green and blue filters 12, 14 and 16 by, for example, a gelatin dyeing method.

On the other hand, for the pixels 19 at which the translucent filters 18 should be formed, gelatin without dyeing process is formed on Cr, the undyed gelatin forming the transparent material 20.

Then, the protective layer 10 and the common electrodes 11 are laminated.

In the manufacturing method as described above, the step for forming the light shielding layer 21 can be performed simultaneously with the step for forming other filters so that the number of steps can be reduced.

Figure 7:
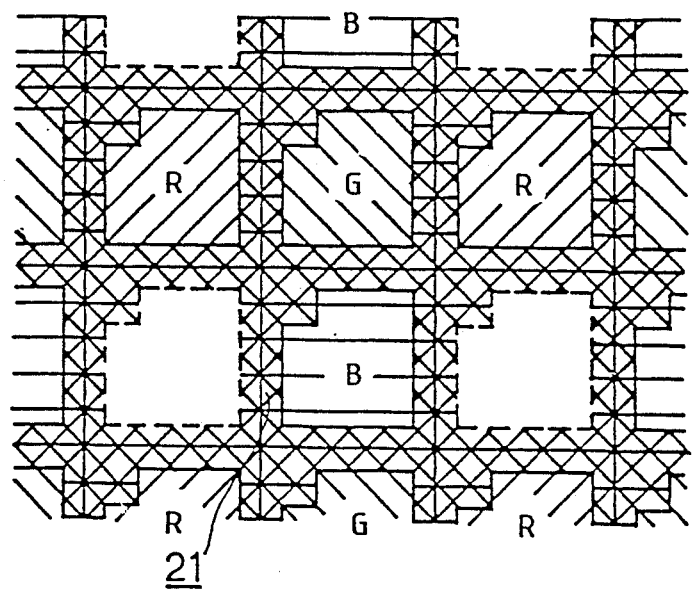
FIG. 7 is a partial plane view of another embodiment of a color liquid crystal display according to this invention.

Although, in the embodiment described above, the light shielding layer 21 is formed by laminating Cr and the filters 12, 14 and 16 of corresponding colors respectively, it may be arranged so that, for example, as shown in FIG. 7, the light shielding layer 21 is formed by laminating Cr and the filters of all colors, for example, in this case, by laminating Cr and red filter 12, and green filter 14, and blue filter 16. In this case, the optical density O.D. of the light shielding layer 21 becomes 3.65, which provides higher contrast. In addition, only one photomask is needed in manufacturing. Furthermore, the variation of the thickness of the shielding layer 21 becomes small.

In the above embodiments Cr is used as the translucent filter 18. Alternatively, other metal such as Mo, Ti, Ta, or Ni may be used instead of Cr.

It is desirable for the thickness of the translucent filter 18 to be sufficiently less than that of the filters 12, 14 and 16, in view of the difference of the level when the peripheries of the filters 12, 14 and 16 overlap with the translucent filter 18.

Although the above embodiment provides the filters on the side of the common electrodes, it may be possible to provide the filters on the side of the pixel electrodes.

Although each display element shown is a square consisting of squares of four colors in the above embodiments, the invention does not restrict its shape or its number. For example, one display unit may consist of two pixels, each pixel may be rectangular, or the pixel pitch may be shifted by one half.

We claim:

1. A color liquid crystal display which has chromatic pixels and achromatic pixels comprising:
   color filters formed at locations corresponding to said chromatic pixels and having a light transmitting area for predetermined wavelength;
   and translucent filters formed at locations corresponding to said achromatic pixels and near an outer periphery of locations corresponding to said chromatic pixels so as to be overlapped with said color filters.

2. A color liquid crystal display as set forth in claim 1 wherein the optical density of said translucent filter is 0.3 to 1.5 .

3. A color liquid crystal display as set forth in claim 1 or 2 wherein said color filters are sets of three color filters each of which has light transmitting areas of red, green and blue, respectively.

4. A color liquid crystal display as set forth in claim 1 or 2 wherein a thickness of said translucent filter is thinner than that of said color filter.

5. A color liquid crystal display as set forth in claim 1 or 2 wherein transparent material is formed on said translucent filters at least at locations corresponding to said achromatic pixels to make their thickness substantially the same as that of the color filters.

6. A color liquid crystal display as set forth in claim 5 wherein a thickness of said translucent filters including a thickness of transparent material, and a thickness of the color filters, are 0.5 to 2.0 microns and the maximum difference between these thicknesses is 0.5 micron.

7. A color liquid crystal display comprising:
a liquid crystal layer having first and second opposite sides;
a first electrode arranged on the first side of the liquid crystal layer, said first electrode comprising at least first and second adjacent pixel electrodes, the first pixel electrode covering an area of the liquid crystal layer forming a first pixel, the second pixel electrode covering an area of the liquid crystal layer forming a second pixel;
a second electrode arranged on the second side of the liquid crystal layer opposite the first and second pixel electrodes;
a color filter covering the first pixel; and
a noncolored translucent filter covering the second pixel, said noncolored translucent filter also overlapping a peripheral portion of the first pixel.

8. A display as claimed in claim 7, characterized in that:
the first and second electrodes are transparent; and
the display further comprises two glass substrates arranged on opposite sides of the liquid crystal layer.

9. A display as claimed in claim 8, characterized in that:
the color filter has a thickness;
the translucent filter has a thickness less than the thickness of the color filter; and
the display further comprises a transparent layer covering the second pixel, said transparent layer having a thickness approximately equal to the difference between the thickness of the color filter and the thickness of the translucent filter.

10. A display as claimed in claim 9, characterized in that the liquid crystal layer has a thickness which is substantially uniform across the first and second pixels.

11. A method for manufacturing a color liquid crystal display comprising the steps of:
forming material constituting translucent filters on a substrate;
removing from said substrate said material constituting said translucent filters at locations corresponding to pixels on which color filters are to be formed;
and forming material constituting said color filters at color filter locations corresponding to pixels on which said color filters are to be formed on said substrate and at locations which are near said color filter locations so as to be overlapped with said material constituting said translucent filters.

12. A method for manufacturing a color liquid crystal display as set forth in claim 11 wherein said material constituting said translucent filters is chromium.

13. A method of manufacturing a color liquid crystal display, said display comprising at least one chromatic pixel and at least one achromatic pixel, said method comprising the steps of:
providing a substrate;
forming a layer of translucent material on the substrate;
removing the layer of translucent material at a location corresponding to an inner portion of the chromatic pixel, while leaving translucent material along a peripheral portion of the chromatic pixel; and
forming a color filter layer over the inner portion of the chromatic pixel and overlapping the layer of translucent material at the peripheral portion of the chromatic pixel.

* * * * *